Nov. 17, 1931. H. E. CHIPMAN 1,832,097
TALKING MOTION PICTURE FILM AND METHOD OF MAKING SAME
Filed July 9, 1928
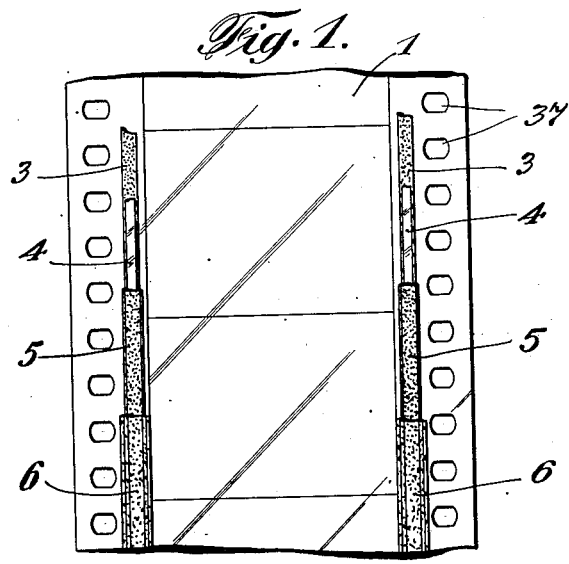
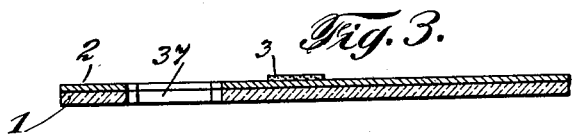
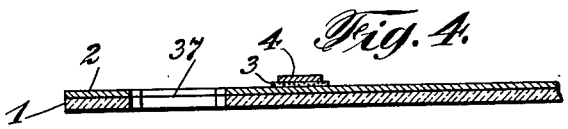
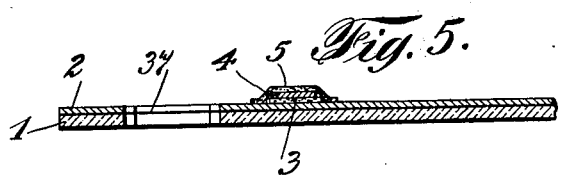
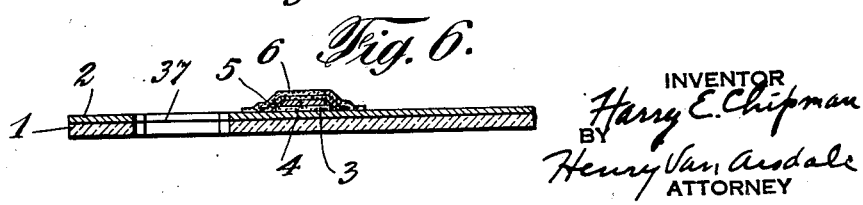

Patented Nov. 17, 1931

1,832,097

UNITED STATES PATENT OFFICE

HARRY E. CHIPMAN, OF SPRINGFIELD, MASSACHUSETTS, ASSIGNOR, BY MESNE ASSIGNMENTS, TO ANDREW LE ROY CHIPMAN, OF NEW YORK, N. Y.

TALKING MOTION PICTURE FILM AND METHOD OF MAKING SAME

Original application filed March 12, 1924, Serial No. 698,588. Divided and this application filed July 9, 1928. Serial No. 291,167.

This invention relates to a talking motion picture film and method of making same and embodies matter divided out of an application filed by me March 12, 1924, Serial No. 698,588. More particularily this invention relates to a motion picture film having one or more strips or ribbons of magnetized material constituting a sound producing and reproducing record secured to the film in a permanent and non-loosening manner and the method employed in so permanently securing the magnetized material to the film.

In the manufacture of talking motion picture films difficulty has been experienced in satisfactorily securing or associating the sound producing element to the picture film. Spring steel ribbon, because it possesses the characteristic of receiving and accurately retaining a varying impressed magnetism, is most satisfactory material from a sound recording and reproducing standpoint. But due to the resilient characteristic and smooth surface of steel ribbon, no method of satisfactorily securing such a sound producing and reproducing material to the picture film has heretofore been devised. As the film is wound upon and unwound from the reel there is a strong tendency for the steel ribbon to become loose and separate from the picture film destroying the synchronism between the talk and the picture and rendering the film useless. Furthermore, there is a natural tendency for the picture film to shrink after passing through the various soaking and drying processes necessary to develop the film. Since the steel ribbon carried thereon does not shrink but remains in its original size, there is a further tendency for the film to draw away and separate from the steel ribbon.

The principal object of this invention is to provide a talking motion picture film especially well suited for the production and reproduction of talking motion pictures which will withstand handling and hard usage without injury or impairment to its talking properties and the method of making such a film quickly, efficiently and without great expense.

Another object of this invention is to produce a talking motion picture film and devise a method for making the same in which the magnetized steel ribbon forming the sound record will not separate from the film strip either before, after, or as a result of the developing process, as a result of passing around the film reels, or as a result of hard and continuous usage.

Other objects of my invention will be in part obvious and in part pointed out hereinafter.

In carrying out my method, I take a motion picture film, preferably of any ordinary type, adapted for the production and reproduction of motion pictures, and securely attach lengthwise on this film one or more strips of magnetizable material, such as spring steel, which is suitable for the production and reproduction of sounds. The talking material is so placed on the motion picture film as not to interfere with picture production and reproduction. I have found that the metallic talking ribbon may be attached to the motion picture film in a suitable manner by means of a bond comprising cementitious material, preferably using three coatings or layers of this material, one applied between the motion picture film and the talking ribbon and two layers subsequently flowed over the applied ribbon.

In order that a clearer understanding of my invention may be had, attention is hereby directed to the accompanying drawings forming a part of this application and illustrating one possible embodiment of my invention.

Referring to the drawings Fig. 1 is a diagrammatical view of the film, illustrating the several steps in the method of production, the film being shown in full with apertures along the sides thereof adapted to be engaged by sprockets on the film reel.

Fig. 2 is a transverse sectional view of a fragment of the motion picture film without the talking ribbon applied.

Fig. 3 is a similar transverse sectional view of the film showing the first layer of cement applied thereto and ready to receive the talking ribbon.

Fig. 4 is a similar sectional view showing the talking ribbon applied.

Fig. 5 is a similar sectional view showing a layer of cement applied over the talking ribbon, and Fig. 6 is a similar sectional view showing another and final coating of cement applied and constitutes a fragment of my complete talking picture film. Similar reference characters refer to similar parts throughout the several views of the drawings.

In carrying out my method, a motion picture film of the usual type may be used, comprising essentially a transparent base 2 made of a suitable pyroxyline composition carrying on one side a suitable photographic emulsion 1. The talking motion picture film comprises this motion picture film with one or more strips or ribbons of magnetizable material, such as thin spring steel, securely attached to the motion picture film, preferably on the unemulsioned side thereof, and extending longitudinally along the length of the film at a place where it will not interfere with the production and reproduction of motion pictures on and from the photographic film.

My process of combining such metallic ribbon and motion picture film comprises first placing a ribbon of suitable cementitious substance 3, such as, cement or other suitable adhesive, along the unemulsioned side of the motion picture film as shown in Figs. 1 and 3. This may be done by feeding the film strip across a cement swabbing point so as to come in contact with the film. Then I lay the metallic talking ribbon 4 on the cement layer 3 as shown in Figs. 1 and 4. This may be done by feeding the ribbon into superimposed relation over the moving picture strip and then pressing them together so as to embed the ribbon in the cementitious material. As shown in Figs. 1 and 5, I then place another coat of cementitious material 5 over the ribbon 4 and when this coat 5 has become suitably dry I finally apply another coat 6 of cementitious material over the coating 5.

Because of the bending and turning of the film as it passes through the recording and reproducing apparatus and again because of the natural shrinking of the film strip due to the alternate soaking and drying of the film during the developing process, the steel ribbon has a great tendency to rip away from the film base, thus ruining the talking picture film. A single interposed application of cement between the ribbon and the film strip such as layer 3, does not give a strong enough bond to prevent this rupture. Applicant has discovered that by applying the cement over the ribbon so that the cement adheres to the film base along the sides of the ribbon, a very strong bond is established and the metallic strip is held to the film base in a satisfactory manner. The three coats of cement bond the metallic ribbon 4 in place permanently and without loosening on the motion picture film even after going through the developing process and after rough handling and hard usage.

The above steps for permanently securing the ribbon to the film strips are preferably carried out in a dark room, so as not to spoil the sensitiveness of the emulsion 1. A film produced in accordance with my invention presents the photographic emulsion in a satisfactory manner for the production and reproduction of motion pictures, and the talking ribbon 4 thereon is properly presented for the production and reproduction of sounds in exact synchronism with the pictures of the photographic film. Although I have described the article and method with reference to a talking motion picture film having a single talking strip, I preferably incorporate two parallel talking strips on the film, the second strip being applied in the same manner as above described. It has been found that sometimes better production and reproduction of the sounds is obtained by using two such ribbons instead of a single ribbon.

The steel strips, especially when two are applied, one on each side, materially tend to prevent shrinkage of the film, since the strips do not shrink.

The steel strip or strips may be applied to either side of the film.

The bond of cementitious material should, of course, adhere firmly and strongly to the film and steel ribbon. A bond including cellulose is preferred, also a bond which, when dry, will not be so brittle as to break or crack when the film bends and turns, nor should the bond be such that it will become weakened or softened by the water or the chemicals of the photographic treatment, nor softened or weakened by the heat of the light of the projection machine.

The film may be provided with apertures 37 along the sides thereof with which sprockets on the film reel are adapted to engage, to move the film along.

As many changes could be made in the above construction, and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. The method of producing talking motion picture film, which includes depositing cementitious material upon motion picture film, imbedding a ribbon of magnetizable material in said cementitious material, flowing cementitious material over the imbedded ribbon so as to completely cover the ribbon and engage the material along both sides of the ribbon, drying the applied cementitious material, and then flowing additional cementitious material over the material previously applied so as to completely cover said material and to engage the film along both sides of the material.

2. A talking motion picture film comprising a photographic motion picture film having a base provided with a coating of photographic emulsion, a strip of cementitious material on said film, a ribbon of magnetizable material imbedded and cemented in said cementitious material, a layer of cementitious material covering the ribbon completely and cementitiously engaging the motion picture film on both sides of the ribbon, and another and separate layer of cementitious material completely covering the previous layer and cementitiously engaging the film along both sides thereof.

This specification signed and witnessed this 5 day of July, 1928.

HARRY E. CHIPMAN.